No. 760,378. PATENTED MAY 17, 1904.
A. N. & C. B. BORQUIST.
LUBRICATING PULLEY.
APPLICATION FILED JULY 29, 1903.
NO MODEL.
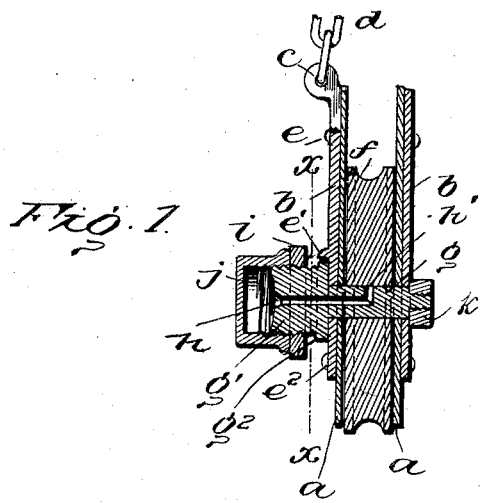
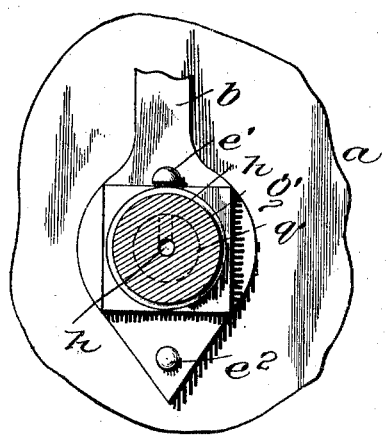
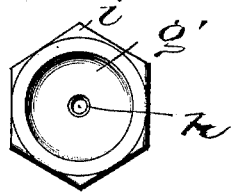
Witnesses: Inventors No. 760,378. Patented May 17, 1904.

UNITED STATES PATENT OFFICE.

AXEL N. BORQUIST AND CHARLES B. BORQUIST, OF PORTLAND, OREGON.

LUBRICATING-PULLEY.

SPECIFICATION forming part of Letters Patent No. 760,378, dated May 17, 1904.

Application filed July 29, 1903. Serial No. 167,502. (No model.)

*To all whom it may concern:*

Be it known that we, AXEL N. BORQUIST and CHARLES B. BORQUIST, citizens of the United States, and residents of Portland, county of Multnomah, and State of Oregon, have invented a new and useful Improvement in Lubricating-Pulleys, of which the following is a specification, reference being had to the accompanying drawings.

Our invention has for its object to provide pulley-blocks to be used in connection with heavy work—such as logging, for example—with means for keeping the same lubricated, such lubricating device, however, to be of very strong construction, so as not to be readily broken in the rough usage which the pulley has to withstand in work.

We accomplish our object by the construction shown in the drawings referred to and hereinafter described and claimed.

In the drawings, Figure 1 is a vertical cross-section of a pulley-block provided with our improved lubricating means. Fig. 2 is a partial section of Fig. 1 on a line $xx$; and Fig. 3 is a left end view of the pulley-pin, also showing the set-collar $i$.

The letters designate the parts referred to.

The shell of our pulley is of common construction, comprising sides $a\ a$, on the exterior of which are riveted straps $b\ b$ by rivets $e\ e'\ e^2$. The straps $b\ b$ are provided with eyes $c\ c$, in which are secured the links of the suspending-chain $d$. The sheave $f$ rotates on an axial pin $g$, inserted through perforations in the straps $b\ b$ and the sides $a\ a$. Such pin $g$ is of the construction observable from Fig. 1. On the left-hand portion thereof is made an enlargement or boss $g'$, having a peripheral thread and an integral square collar $g^2$. When the pin is inserted through the shell and pulley, the collar $g^2$ will abut against the rivet-head $e'$, as illustrated in Fig. 2, thereby holding such pin against turning with the sheave. The pin is further made with an oil-hole $h$, having right-angle course $h'$ leading to the exterior of the pin and providing an outlet for the oil to lubricate the sheave $f$. The entrance to the oil-hole $h$ is made cup-like. On the threaded boss $g'$ is screwed a set-collar $i$. The oil-hole of the pin $g$ is covered by a cap $j$.

The collar $i$ is hexagonal and is a little larger in cross-section than the cap $j$, so that the blows to which such cap would be subjected during working would to a great extent be received by the rim of the collar $i$ instead of the rim of the cap $j$ for the purpose of preventing the latter from being turned by such blows. In the chamber provided by the cap $j$ over the mouth of the oil-hole is inserted heavy lubricant. In case the sheave is insufficiently lubricated and the axial pin becomes heated a portion of such heavy lubricant would become liquid and be fed by gravity through the oil-hole $h$. As the body of the lubricant contained within the cap $j$ is consumed the cap is screwed up, so as to force more lubricant into the oil-hole, the collar $i$ being adjusted to meet the circumstances. The pin $g$ is held in place by the usual nut $k$. Without the set-collar $i$ the cap $j$ would be liable to be turned by the knocks of the pulley-block, with the result of either turning such cap off or turning the same up and forcing an undue quantity of lubricant through the oil-hole of the pin. This the said collar prevents, for after the cap $j$ has been properly adjusted the said collar is screwed up tight against it and holds it against turning. The square integral collar $g^2$ provides a convenient means, in connection with the rivet-head $e'$, to hold the pin $g$ against turning, which is essential in order to keep the angular course $h'$ in its proper vertical position.

Having fully described our invention, what we claim, and desire to secure by Letters Patent, is—

1. In a pulley, an axial pin, one end of which is made with an enlargement or boss, provided with a peripheral thread and a longitudinal oil-hole, terminating in a course $h'$; a cap screwing on said threaded boss and constituting a lubricant-storing chamber, a threaded set-collar for locking such cap in its adjusted position, such set-collar being of larger cross-section than the rim of the cap, to fend the blows to which the latter may be subjected, and means for holding the pin against turning, substantially as described.

2. In a pulley-block, an axial pin made at one end with an enlargement or boss, provided with a peripheral thread and a longitudinal oil-hole, terminating in a course $h'$, a cap screwing on said threaded boss and constituting a lubricant-storing chamber; a threaded set-collar for locking such cap in its adjusted position, such set-collar being of larger cross-section than the rim of the cap, to fend the blows to which the latter may be subjected, said pin being also made with an integral collar and the shell of the pulley being made with a projecting rivet-head $e'$ against which such integral collar abuts, and thus holds the axial pin against turning, substantially as described.

In testimony whereof we have hereunto affixed our signatures in the presence of two witnesses.

AXEL N. BORQUIST.
CHARLES B. BORQUIST.

Witnesses:
GEO. E. WALKER,
W. H. MARTIN.